United States Patent
Zimmermann

(10) Patent No.: US 8,956,136 B2
(45) Date of Patent: Feb. 17, 2015

(54) METHOD OF AND DEVICE FOR COOLING BLOWN FILM DURING THE PRODUCTION OF BLOWN FILM

(75) Inventor: Richard Zimmermann, Bonn (DE)

(73) Assignee: Kdesign GmbH, Konigswinter (DE)

( * ) Notice: Subject to any disclaimer, the term of this patent is extended or adjusted under 35 U.S.C. 154(b) by 0 days.

(21) Appl. No.: 12/148,171

(22) Filed: Apr. 17, 2008

(65) Prior Publication Data

US 2008/0258325 A1    Oct. 23, 2008

(30) Foreign Application Priority Data

Apr. 17, 2007   (DE) .......................... 10 2007 018 417

(51) Int. Cl.
| | | |
|---|---|---|
| *B29C 47/88* | (2006.01) | |
| *B29C 47/90* | (2006.01) | |
| *B29C 47/92* | (2006.01) | |

(Continued)

(52) U.S. Cl.
CPC ........... *B29C 47/8835* (2013.01); *B29C 47/883* (2013.01); *B29C 47/903* (2013.01); *B29C 47/92* (2013.01); *B29C 47/0026* (2013.01); *B29C 47/0057* (2013.01); *B29C 47/0059* (2013.01); *B29C 2947/92152* (2013.01); *B29C 2947/92428* (2013.01); *B29C 2947/926* (2013.01); *B29C 2947/92647* (2013.01); *B29C 2947/92704* (2013.01); *B29C 2947/92923* (2013.01); *B29L 2023/001* (2013.01)
USPC ...................................................... 425/72.1

(58) Field of Classification Search
USPC ............... 264/564–566, 568–569; 425/326.1, 425/387.1
See application file for complete search history.

(56) References Cited

U.S. PATENT DOCUMENTS 3,599,286 A * 8/1971 Karet ............................. 425/464
4,259,047 A * 3/1981 Cole ............................. 425/72.1

(Continued)

FOREIGN PATENT DOCUMENTS

DE     19842778 A1 *  3/2000
EP      1736297 A1 * 12/2006

OTHER PUBLICATIONS

English abstract of EP1736297.*

(Continued)

*Primary Examiner* — Larry Thrower
*Assistant Examiner* — Xue Liu
(74) *Attorney, Agent, or Firm* — MacMillan, Sobanski & Todd, LLC

(57) ABSTRACT

A method of cooling blown film consisting of thermoplastic plastics during the production of blown film by means of a blown film extruder with a film blowing head which comprises an annular nozzle from which the blown film emerges and is guided away in an extraction direction, wherein at least two cooling gas flows are made to approach the blown film from the outside in at least two blowing-out planes located at a distance from the annular nozzle, wherein at least one cooling gas flow $K_G$ is blown out in the direction opposed to the extraction direction of the blown film and wherein at least one cooling gas flow $K_A$ is blown out in the extraction direction of the blown film, and wherein, at least one of the cooling gas flows $K_G$, $K_A$ can be controlled around their circumference in sectors, at least in respect of its volume flow or temperature.

15 Claims, 12 Drawing Sheets

(51) Int. Cl.
  *B29C 47/00* (2006.01)
  *B29L 23/00* (2006.01)

(56) References Cited

U.S. PATENT DOCUMENTS

| | | | |
|---|---|---|---|
| 4,472,343 A * | 9/1984 | Kawamura et al. | 264/565 |
| 4,842,803 A * | 6/1989 | Bose et al. | 264/565 |
| 5,505,601 A * | 4/1996 | Sensen et al. | 425/72.1 |
| 5,804,221 A * | 9/1998 | Planeta et al. | 425/72.1 |
| 6,783,344 B1 * | 8/2004 | Rudolf | 425/72.1 |
| 2005/0285315 A1 * | 12/2005 | Fahling et al. | 264/568 |

OTHER PUBLICATIONS

English abstract of DE19842778.*

* cited by examiner

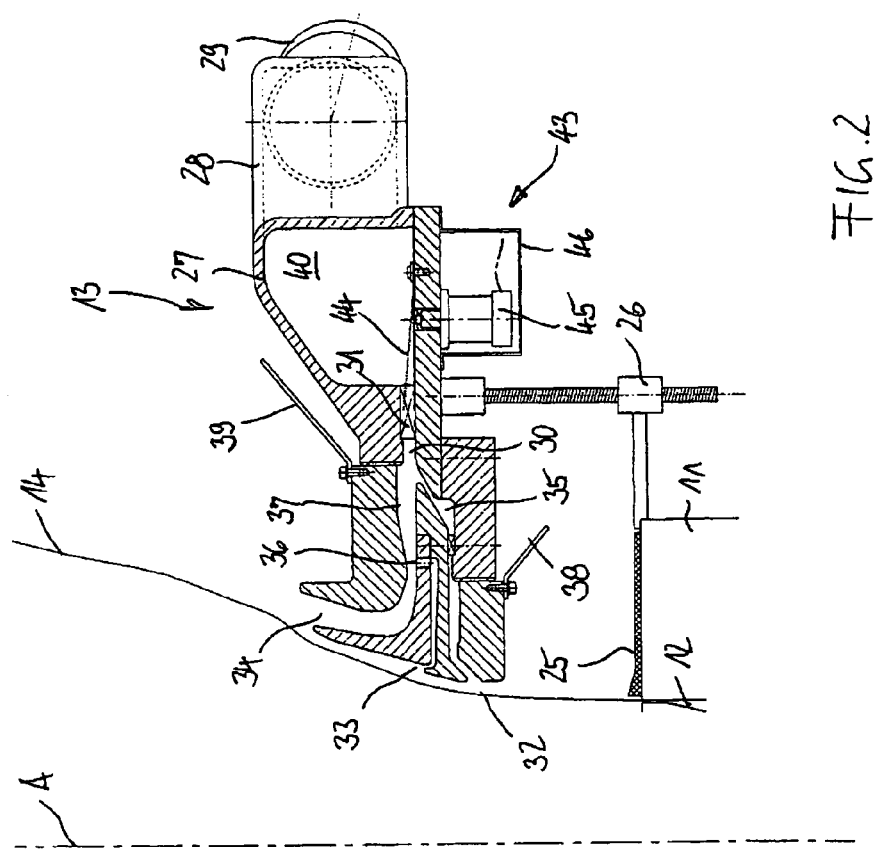
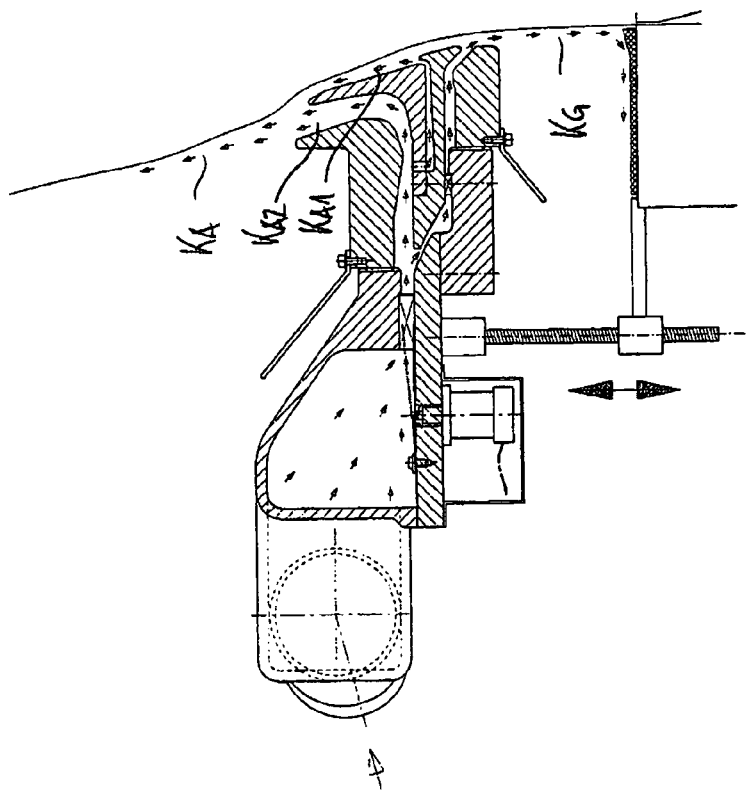
FIG. 2

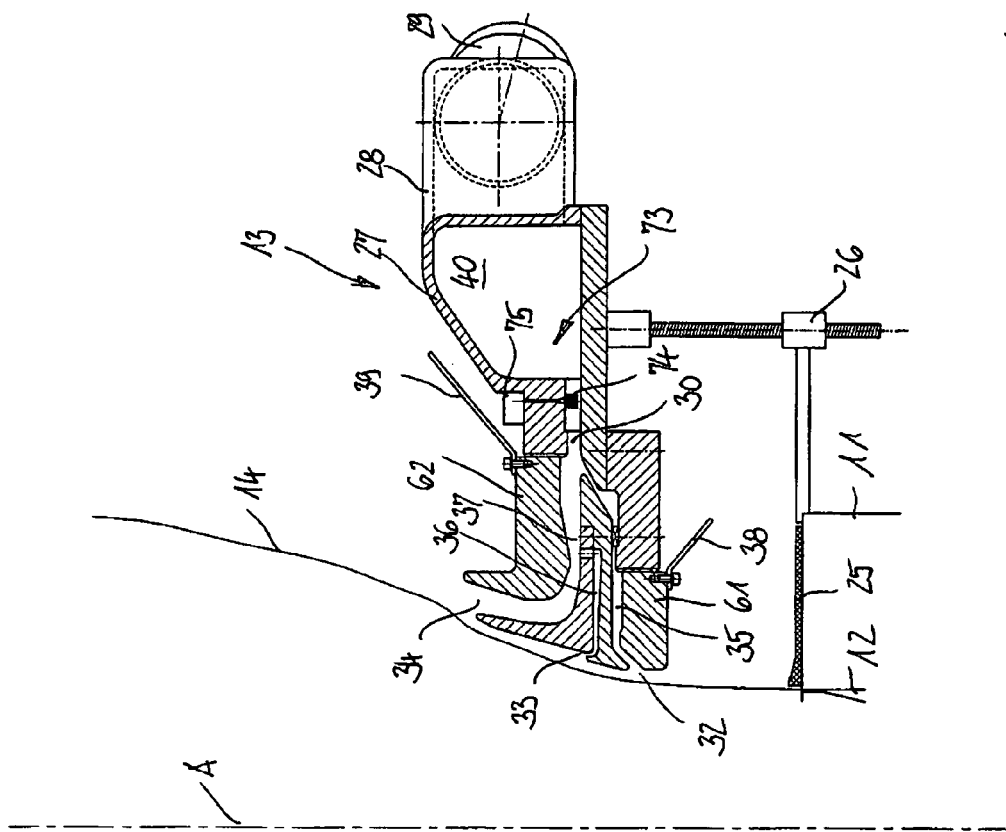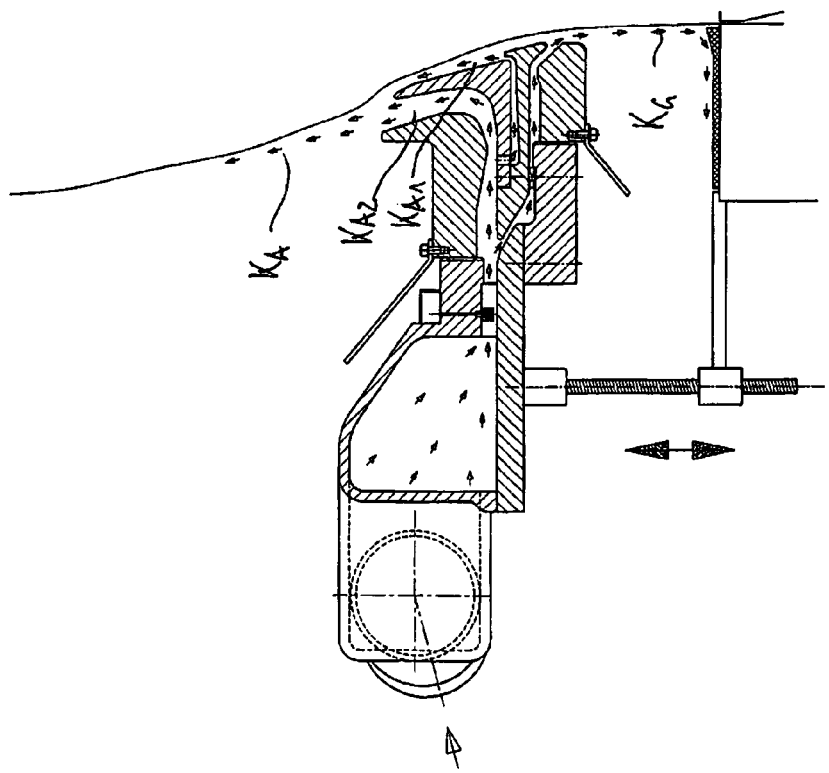
FIG.4

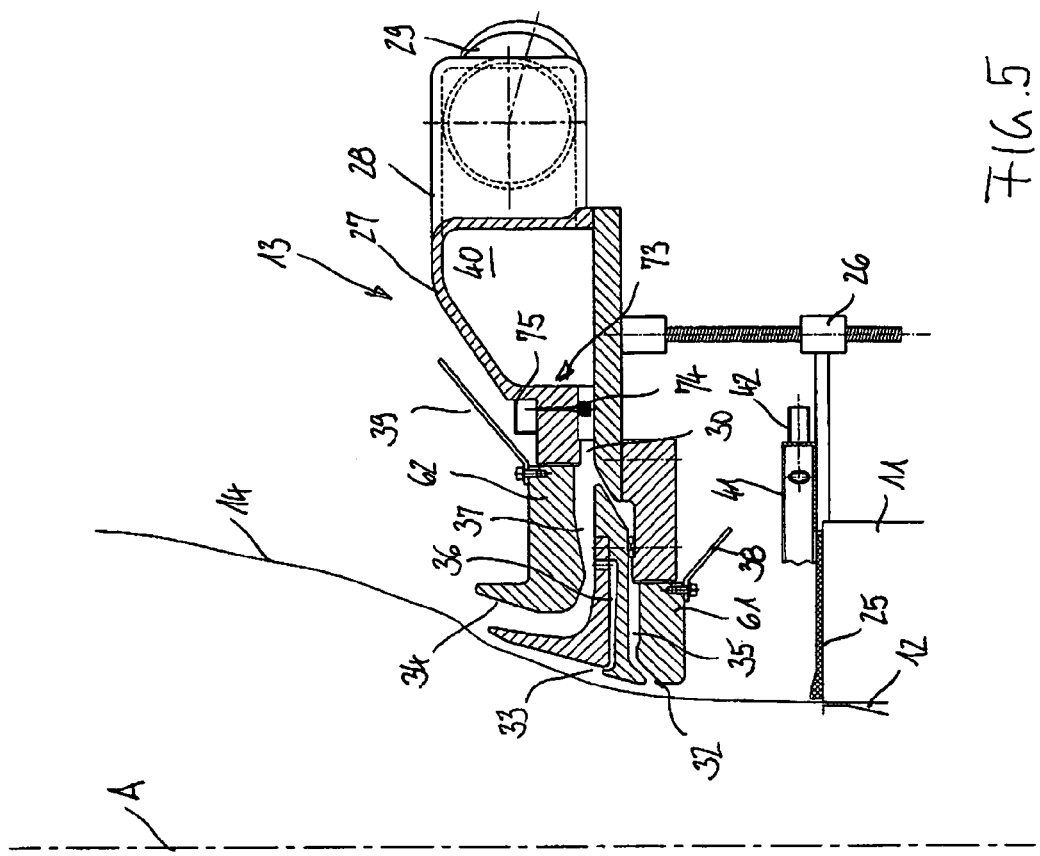
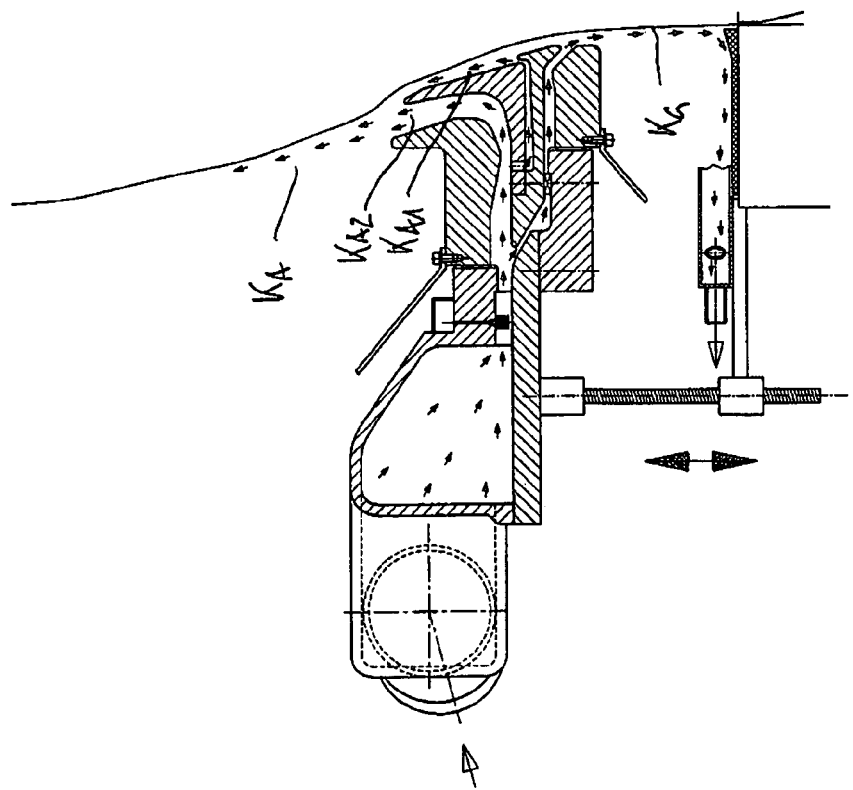
FIG. 5

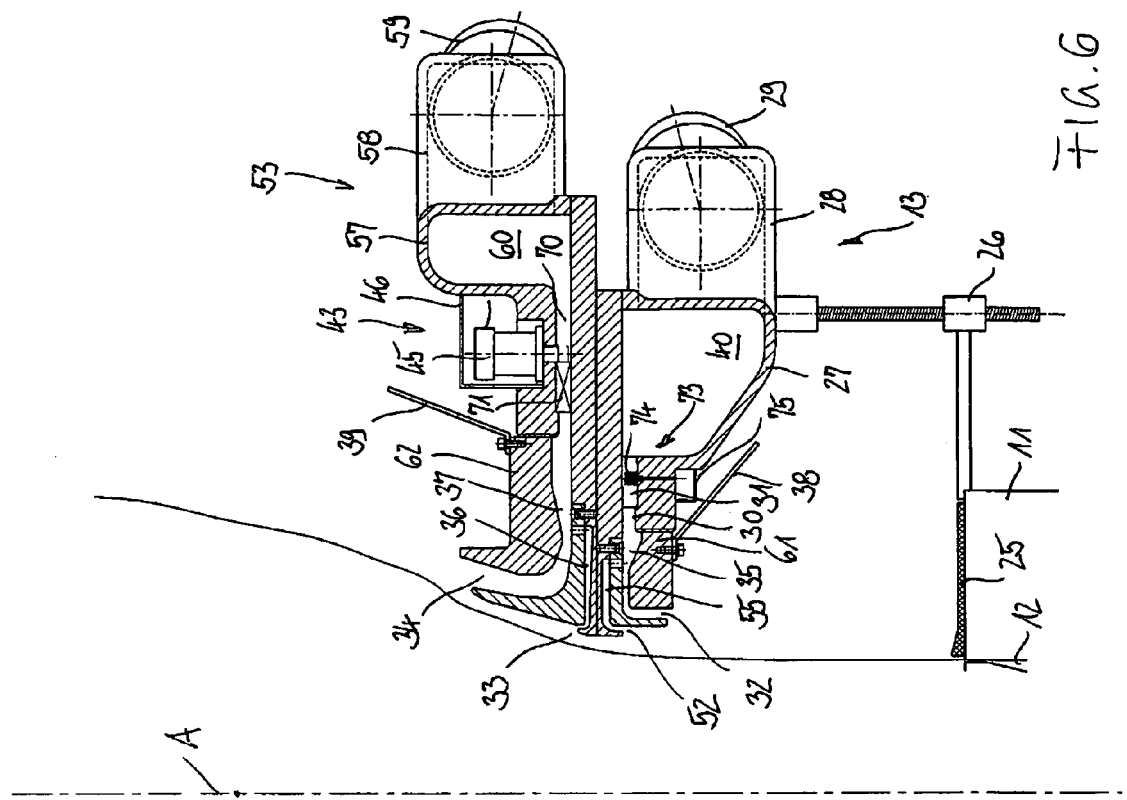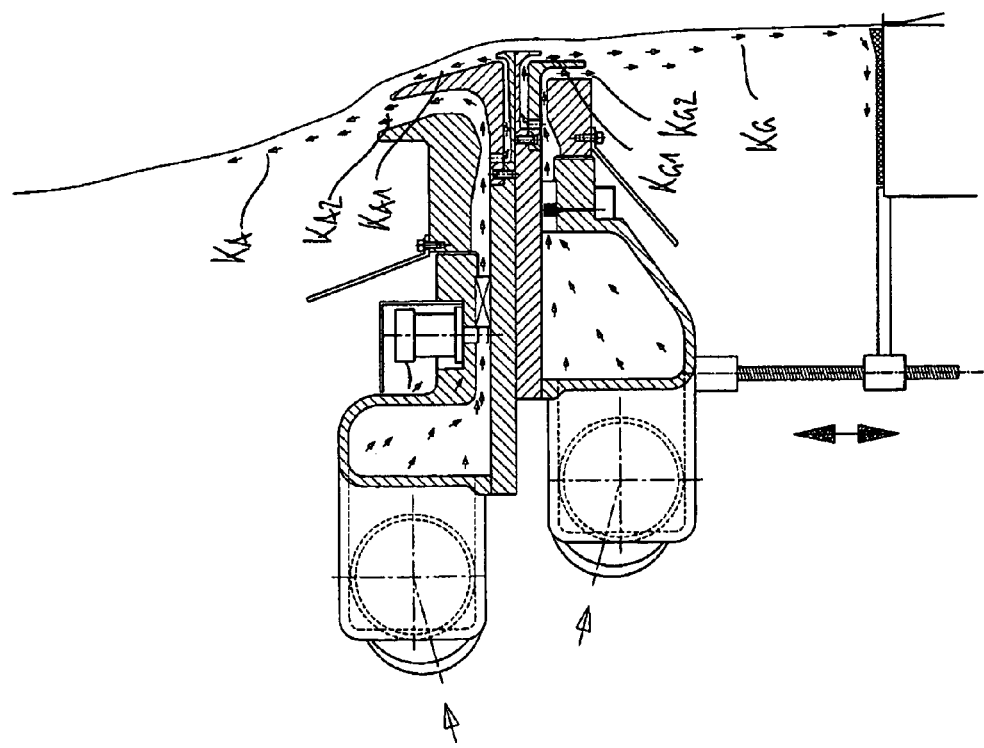
FIG. 6

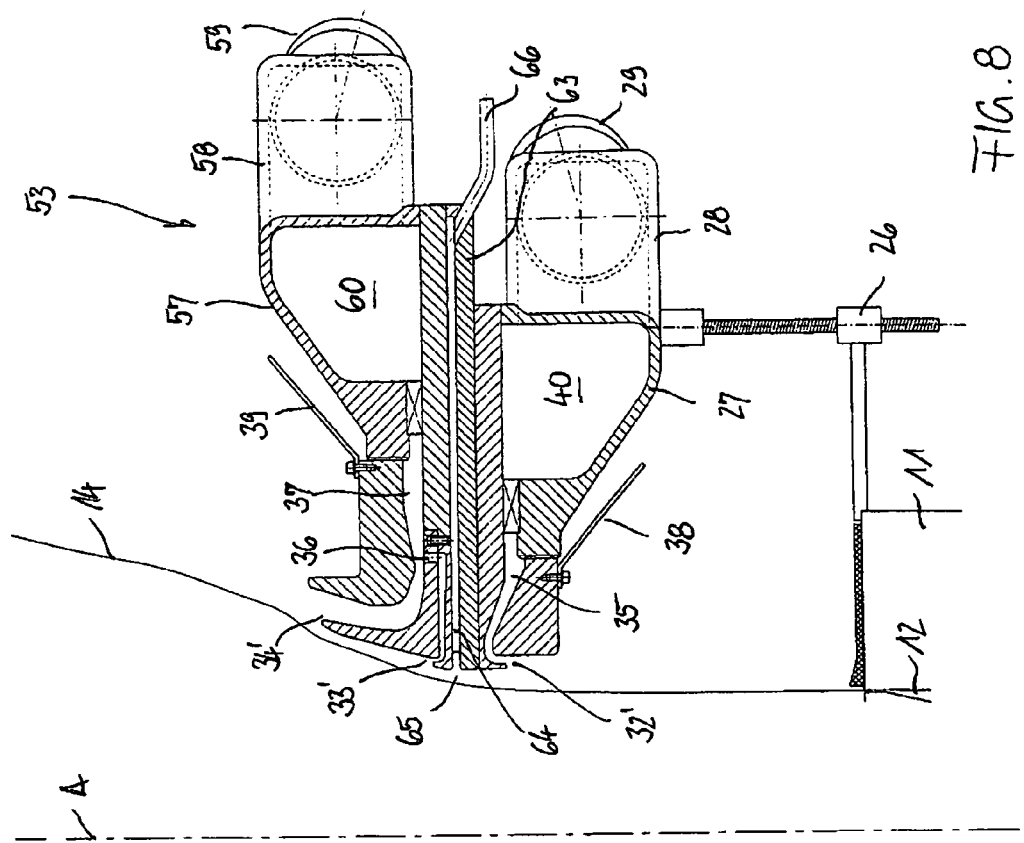
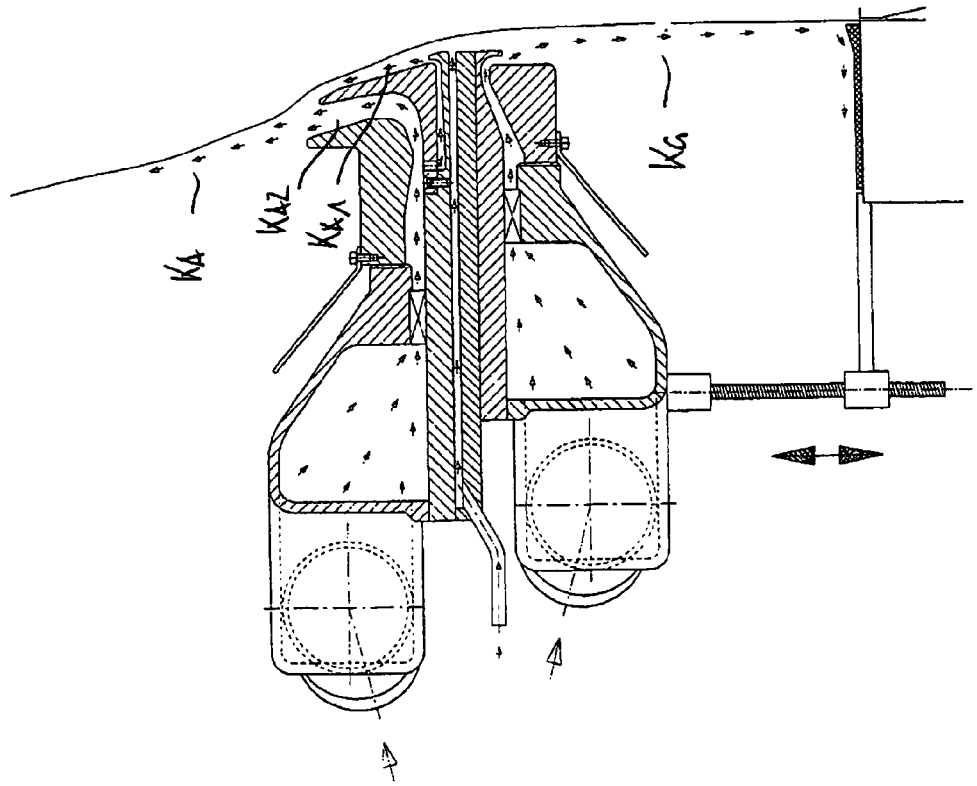
FIG. 8

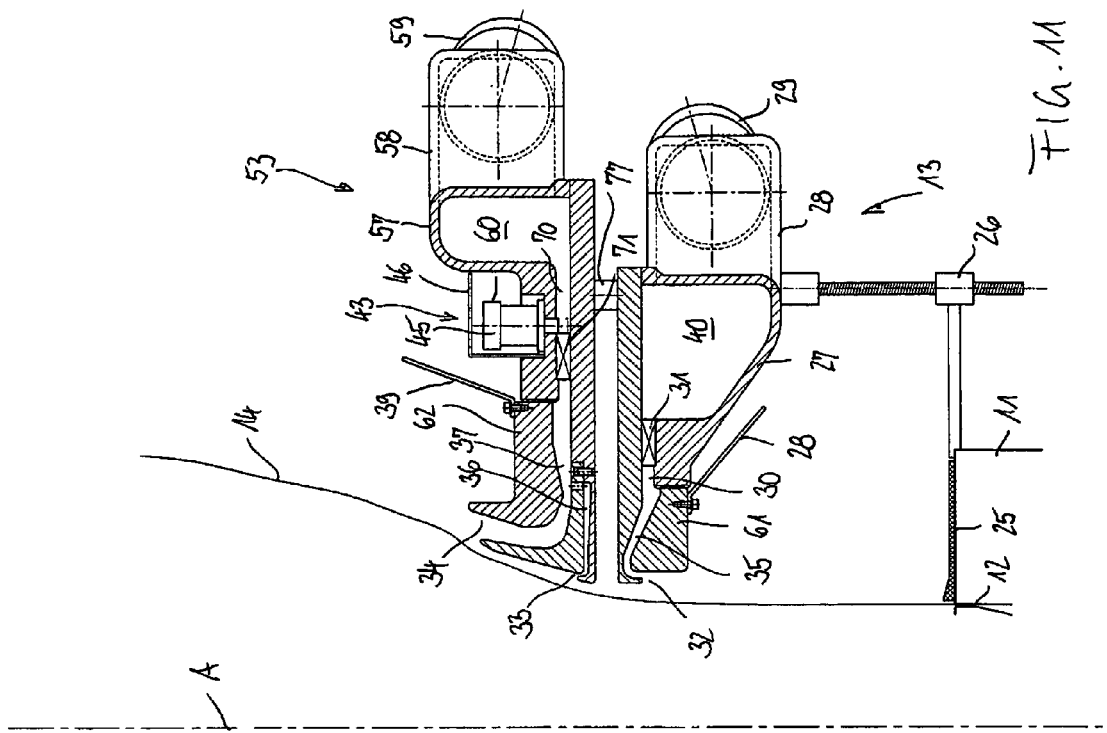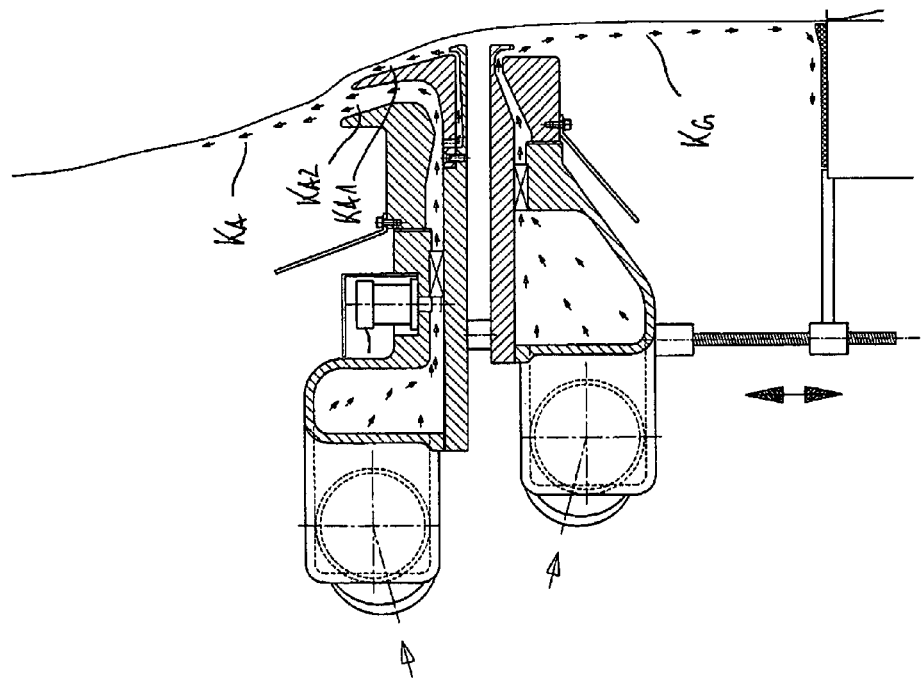

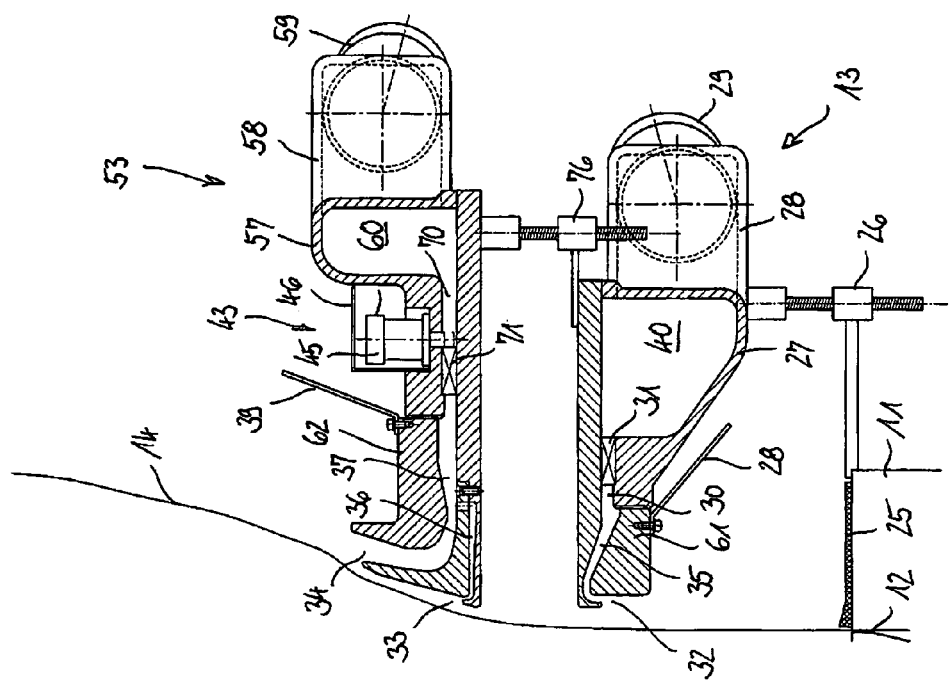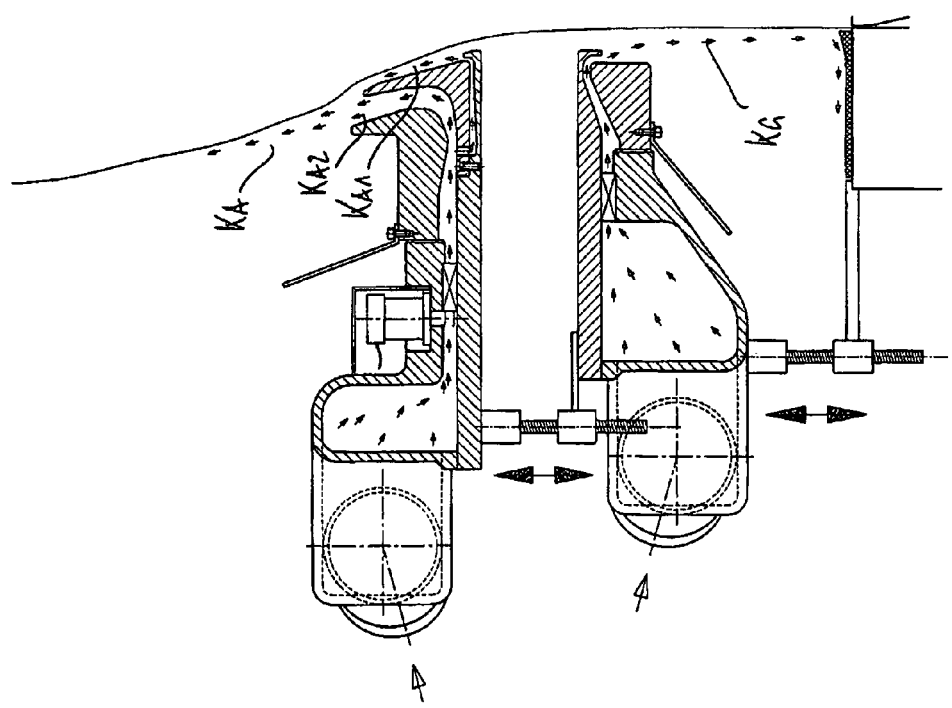
FIG. 12

METHOD OF AND DEVICE FOR COOLING BLOWN FILM DURING THE PRODUCTION OF BLOWN FILM

BACKGROUND AND SUMMARY OF THE INVENTION

The invention relates to a method of cooling blown film comprising thermoplastic plastics during the production of blown film by means of a blown film extruder with a film blowing head which comprises an annular nozzle from which the blown film emerges and is guided away in an extraction direction. At least two cooling gas flows are made to approach the blown film from the outside in at least two blowing-out planes located at a distance from the annular nozzle. The invention also relates to a device for cooling blown film comprising of thermoplastic plastics during the production of blown film arranged at a blown film extruder with a film blowing head comprising an annular nozzle from which the blown film emerges and is guided away in an extraction direction. At least two annular cooling gas nozzles are arranged at a distance from the annular nozzle from at least two blowing-out planes for cooling gas.

The blown film can be produced and extracted along a vertical longitudinal axis A, and, an extraction direction can extend from the bottom to the top. The annular nozzle can be aligned in a corresponding direction. Alternatively, if the annular nozzle is suitably aligned, the extraction direction can be orientated from the top to the bottom.

As described herein, the extraction direction is generally provided from the bottom to the top. However, alternative embodiments and methods according to the invention can be provided wherein the extraction direction is from the top to the bottom.

For the output performance and thus for the economic efficiency of the above-mentioned method of producing blown film and of the devices involved, the process of cooling the blown film at the time of its exit from the annular nozzle up to the point in time of reaching a freezing limit comprises an important factor, wherein output rate can be increased by improving the cooling effect.

For cooling purposes, dual cooling rings can be provided and which can be arranged directly above the annular nozzle and can comprise a uniform cooling ring housing. Cooling gas nozzles can be provided, which form two blowing-out planes for cooling gas. An example of cooling gas is described in U.S. Pat. No. 5,804,221 A.

For improving the cooling effect further, double cooling rings can be provided wherein two independent cooling ring housings can be arranged one behind the other and can be spaced from one another in the direction of production, with the lower cooling ring being mounted directly on the film blowing head and with the upper cooling ring being arranged in such a way that its height is adjustable relative to the lower cooling ring. When the blown film enters the upper cooling ring, it can have been pre-cooled by the lower cooling ring. In this case, the effect of the upper cooling ring can be adversely affected in that the cooling gas emerging from the lower cooling ring has already been heated along the blown film and enters the upper cooling ring from below. Furthermore, access to the annular nozzle, which is important when starting the system, can be complicated by the lower cooling ring positioned on the film blowing head. A similar such device is described in EP 1 719 602 A1 for example.

In DE 32 43 884 A1, a method is described for delivering cooling air during the production of a film tube in the extraction direction. These cooling rings are provided with an annular channel being supplied via a single air supply neck. Cooling rings of similar design are shown and described in JP 59-007 019 A, in JP 58-191 126 A and in JP 58-094 434 A.

OBJECTS OF THE INVENTION

One object of the present invention is to provide a method and a device of the initially mentioned types wherein the cooling effect can be improved, and thereby extraction speed of the blown film can be increased and consequently the output rate of the device can be increased. A further object is avoidance of loss in quality of the blown film produced.

One of the objectives can be achieved by using a method of the above-mentioned type wherein at least a first cooling gas flow $K_G$ is blown out in a direction opposed to the extraction direction of the blown film. In addition, at least one further cooling gas flow $K_A$ is blown out in the extraction direction of the blown film. At least one of the cooling gas flows $K_G$, $K_A$ can be controlled around their circumference in sectors at least in respect to its volume flow and/or its temperature. Preferably the cooling gas flow $K_A$ blown out most near to the annular nozzle is blown out in the direction opposed to the extraction direction of the blown film, and the cooling gas flow $K_A$ blown out most distant from the annular nozzle is blown out in the extraction direction of the blown film. A mutual disturbance or interference of the cooling gas flows can thereby be avoided. The first blowing-out plane can be arranged at some distance from the annular nozzle. An important aspect which leads to an increase in the cooling effect is that cooling gas already heated from the first blowing-out plane can be prevented from entering the region of the further blowing-out plane or planes in the extraction direction. Furthermore, cooling by the first cooling gas flow $K_G$—directed in the direction opposed to the extraction direction—can be provided in accordance with the above described counter flow cooling principle. Namely, the freshly introduced cooling gas can be provided to be relatively coldest in that region where a reduced blown film temperature has already been achieved, whereas in the region where the blown film is still hot upon leaving the annular nozzle, the cooling gas has already been slightly heated. In this way it is possible to maintain a relatively uniform, adapted temperature difference along the entire cooling path, and thereby produce the most advantageous cooling effect. The increased thickness deviations that can result when increasing output rate can thus be compensated by providing the controllable cooling in sectors around the circumference of the blown film in accordance with the invention.

A method and device according to the invention are provided wherein at least one of the cooling gas flows $K_G$, $K_A$ can be controlled in respect to its volume flow around the circumference in sectors. In addition or in the alternative, the temperature of the cooling gas flows can be influenced around the circumference in sectors. In this way it is possible to minimize any deviations in the thickness profile of the blown film around the circumference during the production process, with use being made of the effect that during the process of blowing the film, i.e. when widening the tube diameter, hotter regions are widened to a greater extent than cooler regions. In the case of a greater cooling effect in one circumferential sector, the blown film cools more quickly and can be expanded to a lesser extent and thus can retain its relatively greater film thickness. If the cooling effect is less pronounced in one circumferential sector, the blown film can be made to retain a higher temperature and can thus be expanded to a greater extent, and as a consequence, the film thickness can be reduced to a greater extent. The differences in film thickness around the circumference can be determined by a measuring device and transmitted to a control device for the purpose of varying the cooling or heating output. In one embodiment, a measuring device can be arranged in the direction of production at a point behind a freezing limit of the film material, behind which freezing limit, the film material may not be plastically expanded. A device which permits variable cooling of the blown film in sectors is described in EP 1 736 297 A1.

As the first cooling gas flow $K_G$ can be provided to be blown out against the extraction direction and is effective according to the counter flow cooling principle; a second cooling gas flow $K_A$ can also be provided to be blown out in the extraction direction, and which flows off along the blown film so as to be relatively undisturbed by the first cooling gas flow. The first cooling gas flow $K_G$ can be substantially removed from the region, or sucked off substantially annularly in the region of the annular nozzle, so that any gas emissions from the blown film, which are most pronounced in the region directly adjoining the annular nozzle, can be removed together with the first cooling gas flow. The system parts following in the extraction direction are thus prevented from being polluted. The second cooling gas flow $K_A$ which is blown out in the extraction direction no longer has any major effects after the blown film has reached the so-called freezing limit. However, in the interest of preventing an adjoining calibrating device and/or flattening device from being polluted, it can also be advantageous to suck off or substantially remove the second cooling gas flow $K_A$, which can be annularly distributed around the circumference. A device providing gas removal is described in EP 1 491 319 A1.

According to an advantageous embodiment of a process according to the invention, at least one of the cooling gas flows $K_G$, $K_A$, can be formed by at least two partial flows $K_G 1$, $K_G 2$, $K_A 1$, $K_A 2$ emerging in different blowing-out planes. It is thus possible to increase the cooling gas quantity without adversely affecting the shape of the blown film.

In one embodiment, the distance of the blowing out plane of the at least one cooling gas flow $K_G$ blown out against the extraction direction of the blown film from the annular nozzle can be provided to be constant. However, for setting the cooling effect, it can be advantageous to adjust this distance and thereby permit the length of the cooling path to be influenced directly. In addition, for a starting phase of a system according to the invention, it can be advantageous if the distance can be increased, and free access provided to the annular nozzle.

In a further embodiment of the invention, the distance of the blowing-out plane of the at least one further cooling gas flow $K_A$ blown out in the extraction direction of the blown film from the annular nozzle and, respectively, from the blowing-out plane of the first cooling gas flow $K_G$ can be adjustable for changing the cooling effect.

In accordance with the above-mentioned processes, an embodiment of a device according to the invention can be provided wherein at least a first annular cooling gas nozzle is directed against the extraction direction of the blown film and wherein at least a further annular cooling gas nozzle is directed in the extraction direction of the blown film. In addition, circumferentially variably controllers can be provided in sectors for controlling the volume flow. In addition, or in the alternative, the circumferentially variably controllers can be provided in sectors for controlling the temperature of the cooling gas flow of at least one of the annular cooling gas nozzles. In addition, or in the alternative, at least two annular cooling gas nozzles can be provided and directed in the extraction direction of the blown film. In addition, or in the alternative, at least two annular cooling gas nozzles can be provided and directed opposed to the extraction direction of the blown film. In addition, or in the alternative, at least two annular cooling gas nozzles can be provided and directed opposed to the extraction direction of the blown film. In order to avoid disadvantageous effects of the emissions emitted by the blown film after having left the annular nozzle, it is proposed that, between the annular nozzle of the film blowing head and the first annular cooling gas nozzle directed against the extraction direction of the blown film, a gas removal or a sucking-off device can be provided for cooling gas, which gas removal device can be provided to extend and/or be distributed around the circumference. The gas removal device can be comprised of individual gas-removal elements attached to hoses, as a result of which mounting and dismantling procedures can be simplified. To protect the film blowing head from cooling down, which is preferably kept at a constant temperature, an annular thermal insulator or an annular deflection plate can be provided above the film blowing head.

In an embodiment of the invention, at least one annular cooling gas nozzle can be provided and directed against the extraction direction of the blown film and the at least one annular cooling gas nozzle can be directed in the extraction direction of the blown film. These nozzles can comprise a common cooling ring or cooling ring module. In an embodiment of the invention, one common annular chamber can be provided to be supplied with cooling gas via circumferentially distributed connecting sleeves, and prior to the cooling gas finally leaving the cooling ring module, the cooling gas can be divided into individual cooling gas flows.

According to an alternative embodiment, at least one annular cooling gas nozzle can be directed against the extraction direction of the blown film and can constitute an element of a first cooling ring or cooling ring module. The at least one annular cooling gas nozzle can be directed in the extraction direction of the blown film and can constitute an element of a second cooling ring or cooling ring module. These two modules, too, can be supplied by one single cooling gas blower, with the cooling gas flow being divided in front of the cooling ring modules. However, it is also possible to provide a dedicated blower for each cooling ring module for ensuring a separate cooling gas supply. Providing two cooling ring modules is advantageous in that the distance between them can be varied, so that in addition to controlling the cooling gas quantity, the length of the cooling path can be varied too, if desired. The two cooling ring modules can be supplied with respective adjusting devices. Between the first cooling ring module and the second cooling ring module a further cooling ring in form of a disc-shaped housing can be arranged.

Further design details will be explained below with reference to the drawings.

BRIEF DESCRIPTION OF THE DRAWINGS

Embodiments of devices according to the invention are illustrated in the drawings and will be described below.

FIG. 2 illustrates a cooling ring according to FIG. 1 with a cooling gas flow which can be controlled in sectors in the volume flow.

FIG. 4 illustrates the cooling ring which is similar to that shown in FIG. 2, with the temperature of the cooling gas flow being controllable in sectors.

FIG. 5 illustrates the cooling ring according to FIG. 4, as well as a gas removal device or sucking ring for cooling gas arranged above the film blowing head.

FIG. 6 illustrates a cooling device with two separate cooling rings connected to one another.

FIG. 8 illustrates a cooling device with two cooling rings similar to those shown in FIG. 6, with a further cooling ring in form of a disc-shaped housing arranged therebetween.

FIG. 11 illustrates the cooling device with two separate cooling rings connected to one another in a modified embodiment.

FIG. 12 illustrates a cooling device with two separate cooling rings, with the distance therebetween being adjustable.

DETAILED DESCRIPTION

Figure 1:
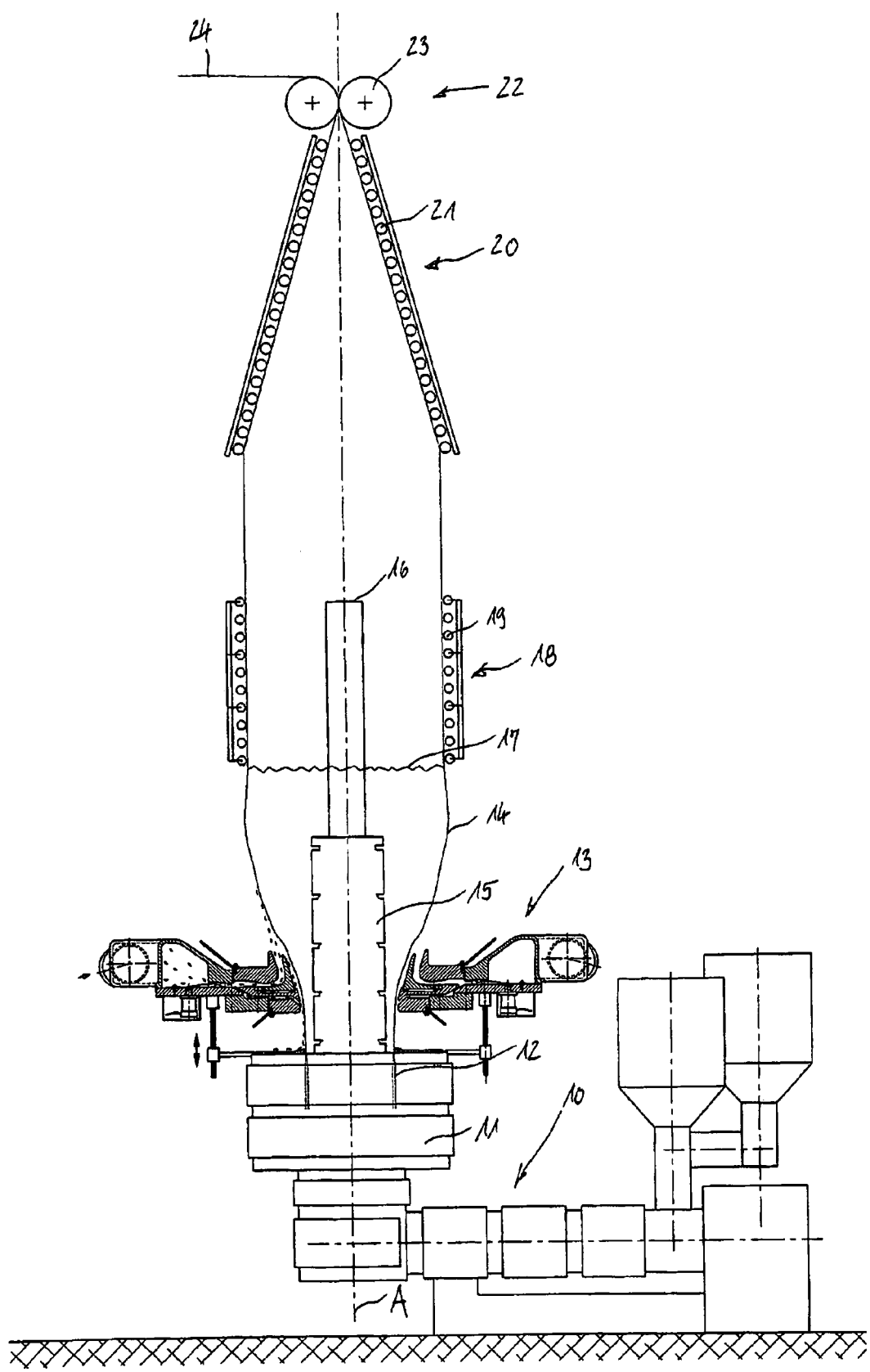
FIG. 1, in a vertical longitudinal section, illustrates a film blowing system with a cooling ring which forms an annular cooling gas nozzle pointing against the extraction direction, and two annular cooling gas nozzles pointing in the extraction direction.

The device shown in FIG. 1 comprises a blown film extruder 10 with a film blowing head 11 which forms an annular nozzle 12 for producing a blown film 14. The joint axis A of the film blowing head 11, of the annular nozzle 12 and of the blown film 14 can be provided to extend vertically. The extraction direction of the blown film can extend from the bottom to the top.

Above, and at a distance from the film blowing head 11, a co-axially arranged cooling ring 13 can be provided which can emit cooling gas for cooling the blown film 14 and whose details of the embodiment shown here will be explained in connection with FIG. 2. Inside the blown film 14 an inner cooling device 15 is provided with a gas removal device, i.e., an inner suction device 16 for further cooling gas. The cooling ring 13 can comprise one or more annular cooling gas nozzles which can generate via a venturi effect a widening effect on the blown film 14 so that the diameter of the latter can be increased in a thermo-plastically deformable phase until it has reached a freezing limit 17. Above the freezing limit 17, a mechanical calibrating device 18 can be provided in which the film diameter and film cross-section can be stabilised. As can be seen, the calibrating device 18 can be comprised of a plurality of rollers 19 and can be arranged substantially annularly around the blown film 14. A calibrating device of the type shown here is described in greater detail in DE 20 2005 006 532 U1.

Above the calibrating device 18, a flattening device 20 can be provided which also comprises a plurality of rollers 21. The flattening device 20 can deviate from the calibrating device in that it is approximately wedge-shaped and can cause the round blown film to form into a flat film connected at the edges. Above the flattening device 20, a pulling-off device 22 can be provided with two pulling-off rollers 23 which can convey and compress the blown film. The blown film can be further guided in the form of a double-layer flat film 24, and optionally in a cut and coiled form.

In FIG. 2, any details identical to those shown in FIG. 1 have been given the same reference numbers. FIG. 2, in a longitudinal section through the longitudinal axis A, the film blowing head 11 can be provided with the annular nozzle 12 for forming the blown film 14. A thermal insulation disc 25 can be placed onto the film blowing head 11. At a distance from the film blowing head 11, a multi-part cooling ring 13 can be provided which can be connected to the film blowing head 11 via a height-adjustable holding device 26. The cooling ring 13 can comprise an annular housing 27 forming an annular chamber 40, and individual tangentially extending running-in sleeves 28 which can change into the annular chamber 40 via a rectangular cross-section and which, in a cross-sectional view, can form round attaching sleeves 29. On the inside of the annular housing 27, an annular exit gap 30 can be provided in which radial conducting webs 31 can calm the cooling gas flow. The annular exit gap 30 can be divided into a lower first annular channel 35 and two annular channels 36, 37 positioned there above and, via said channels, can supply an annular cooling ring nozzle 32 whose exit aperture can be directed against the extraction direction, as well as two annular cooling gas nozzles 33, 34 whose exit apertures can point in the extraction direction. At the cooling ring module 13, a volume flow control device 43 can be arranged which can comprise an annular, radially slotted flat spring 44 positioned inside the annular chamber 40, as well as circumferentially distributed individual setting elements 45 which can be controlled independently of one another and which can be enclosed by an annular housing 46.

The inner contour of the cooling ring 13 can be provided to widen in the extraction and production direction and, together with the blown film, to generate a venturi effect, i.e., a pressure reduction on the cooling air and thereby a suction effect on the blown film. The effect of this forming method is that the diameter of the blown film 14 can be widened in the region of the cooling ring 13 because a vacuum can be provided at the exit of the cooling ring 13, whereas at the same time an excess pressure can be generated inside the blown film by the above-mentioned inner cooling device. The widening of the blown film can be continued until the thermoplastic plastic material solidifies as a result of the cooling effects of the cooling gas, such as when the freezing limit has been reached.

An annular threaded insert 61 can be threaded in at the bottom end of the cooling ring 13, and a threaded insert 62 can be threaded in at the top end of the cooling ring 13. Thereby the threaded inserts 61, 62, the gap width of the annular cooling gas nozzles 32 and 34 can be adjusted. Adjustment levers 38 can be connected to the threaded insert 61 and adjustment levers 39 are connected to the threaded insert 62.

In the left-hand half of FIG. 2, the directions of the cooling gas flows are indicated by arrows. The two annular cooling gas nozzles 33, 34, can allow the exit of cooling gas flows $K_A1$, $K_A2$ in the extraction direction, and can be combined to form a cooling gas flow $K_A$, whereas the annular cooling gas nozzle 32 can be provided to guide a cooling gas flow $K_G$ along the direction of production of the blown film 14 until it hits the thermal insulation disc 25 on the film blowing head 11 from which, it can be deflected radially outward.

Figure 3:
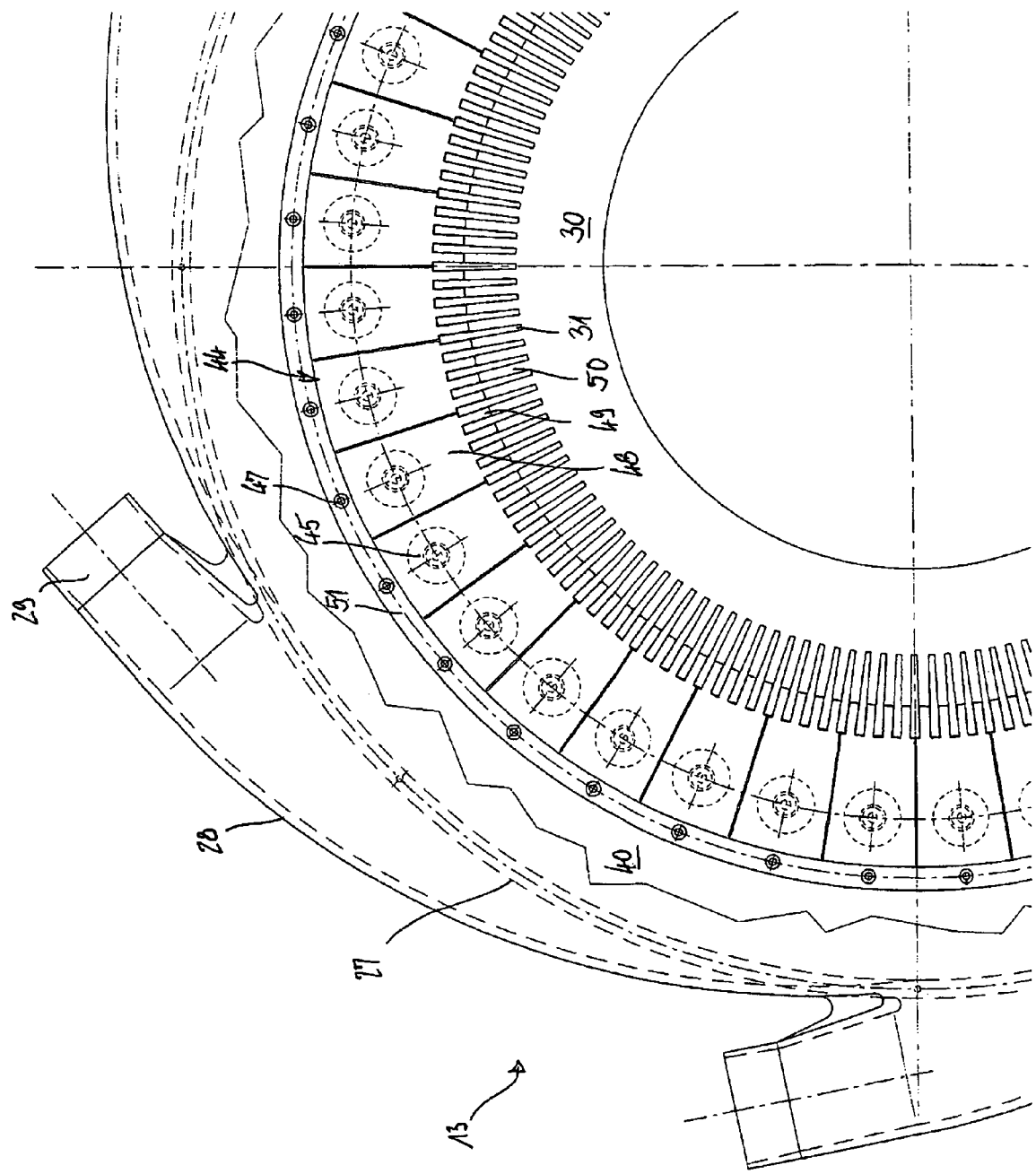
FIG. 3 illustrates details of a cooling ring according to FIG. 2 in a cross-section through the cooling ring.

FIG. 3 shows a cooling ring 13 according to FIG. 2 in a horizontal section. The cooling ring 13 is provided with the annular housing 27, individual running-in sleeves 28 and round attaching sleeves 29. In the annular chamber 40, shown in section, the entire annular, inwardly radially slotted flat spring 44 can be fixed via circumferentially distributed screws 47 on the inside by a clamping ring 51, and which can comprise individual inwardly directed tongues 48 which can be loaded by one of the adjusting elements 45, and can be bent upwardly. The tongues 48 can each comprise a plurality of tongue ends 49 which engage radial channels 50 which can be formed by circumferentially guiding webs 31 in the exit gap 30. In this way, it is possible to vary the free passage cross-sections of the radial channels 50, with several channels being jointly controlled by one single adjusting element 45. In additional, the volume flow can be controlled in sectors around the circumference of the annular exit gap 30, so that the cooling effect on the blown film 14 can be controlled in such a way that a uniform film thickness can be achieved around the circumference, which film thickness can be measured during production from behind the freezing limit either continuously or at intervals.

In FIG. 4, any details identical to those shown in FIG. 2 have been given the same reference numbers. To that extent, reference is made to the description of same. In the cooling ring module 13, a temperature controlling device 73 can be provided which comprises circumferentially distributed, individual heating elements 74 which can be positioned in the annular exit gap 30 at the annular chamber 40 and which can be controlled independently of one another. Control and energy supply can be effected via an annular housing 75. The remaining details have been described in connection with FIG. 2.

In FIG. 5, any details identical to those shown in FIG. 4 have been given the same reference numbers. To that extent, reference is made to the description of same. An annular, inwardly opening suction device 41 can be placed onto the film blowing head, from which suction device 41, the heated cooling gas can be extracted via individual circumferentially distributed sleeves 42, and a filter element can be optionally added. The remaining details have been described in connection with FIG. 2 and FIG. 4.

In FIG. 6, any details identical to those shown in FIG. 2 have been given the same reference numbers. To that extent, reference is made to the description of same. A cooling ring 13 can be provided which can form two annular cooling gas nozzles 32, 52 directed against the extraction direction, and a second cooling ring 53 can be arranged above the cooling ring 13, which second cooling ring 53 in this embodiment can form the two annular cooling gas nozzles 33 and 34 which can be directed in the extraction direction. The two cooling rings 13, 53 can be provided to rest on one another in a planar way and can be threaded to one another. The adjusting holding element 26 can engage directly at the lower cooling ring 13 and, as shown in FIG. 2, can be secured to the film blowing head 11.

The cooling ring 13 can comprise an annular housing 27 and individual tangentially extending running-in sleeves 28 which, via a rectangular cross-section, can change into the annular chamber 40 and, in a cross-sectional view, form the round attaching sleeves 29. On the inside of the annular housing 27, an annular exit gap 30 can be provided in which radial conducting webs 31 can be provided to calm the cooling gas flow. The annular exit gap 30 is divided into a lower first annular channel 35 and a second annular chamber 55 positioned there above, and, via the channels, can supply two annular cooling gas nozzles 32, 52 whose exit apertures are directed against the extraction direction.

The cooling ring 53 can comprise an annular housing 57 forming an annular chamber 60, and individual tangentially extending running-in sleeves 58 which, via a rectangular cross-section, can change into an annular chamber 60 and, in a cross-sectional view, form the round attaching sleeves 59. On the inside of the annular housing 57, an exit gap 70 can be provided in which radial guiding webs 71 can be provided to calm the cooling gas flow. The exit gap 70 is divided into two annular channels 36, 37 and, via the channels, can supply the two annular cooling gas nozzles 33, 34 whose exit apertures are directed in the extraction direction.

The entire inner contour of the cooling rings 13, 53 widens in the extraction and production direction and, together with the blown film, can generate a venturi effect, i.e., a pressure reduction acting on the cooling air and thereby a suction and widening effect on the blown film. The effect of said type of forming process is that the diameter of the blown film 14 can widen in the region of the cooling rings 13, 53, because a vacuum is generated at the exit of the cooling ring 53, whereas, at the same time, excess pressure can prevail inside the blown film as a result of the above-mentioned inner cooling device. The widening of the blown film can continue until the thermoplastic plastic material solidifies as a result of the cooling effects of the cooling gas, i.e. the freezing limit has been reached.

An annular threaded insert 61 is threaded in at the bottom end of the cooling ring 13, whereas a threaded insert 62 is threaded in at the top end of the cooling ring 13, by means of which threaded inserts 61, 62 the gap width of the annular cooling gas nozzles 32 and 34 can be adjusted. Adjustment levers 38, 39 are connected to the threaded inserts 61, 62.

The cooling gas supply for the two cooling rings 13, 53 can be effected by a blower for each of the cooling rings, and the blowers or the supply channels can be controllable. Alternatively, it is possible to provide one single cooling blower for supplying both cooling rings 13, 53. In the supply channels a controllable junction can be provided. In addition, or in the alternative, the blower can also be controllable.

At the lower cooling ring 13, a temperature controlling device 73 can be provided which comprises an attached annular housing 75 and individually controllable, circumferentially distributed heating elements 74 in the exit gap 30. This temperature controlling device can be used for the differentiated, circumferential control of the temperature of the cooling gas emerging against the extraction direction. At the upper cooling ring 53, a volume flow controlling device 43 can be provided which comprises individually controllable, circumferentially distributed setting elements 45 which, via a journal, can act on a slide which can vary the cross-section of a circumferential region of the annular exit gap 70.

The directions of the cooling gas flows are indicated by arrows in the left-hand half of the Figure. The annular cooling gas nozzles 33, 34 conduct the cooling gas along the blown film in the production and extraction direction, whereas the annular cooling gas nozzles 32, 52 allow cooling gas to flow along the blown film against the production direction until it hits the thermal insulation disc 25 at the film blowing head 11.

Figure 7:
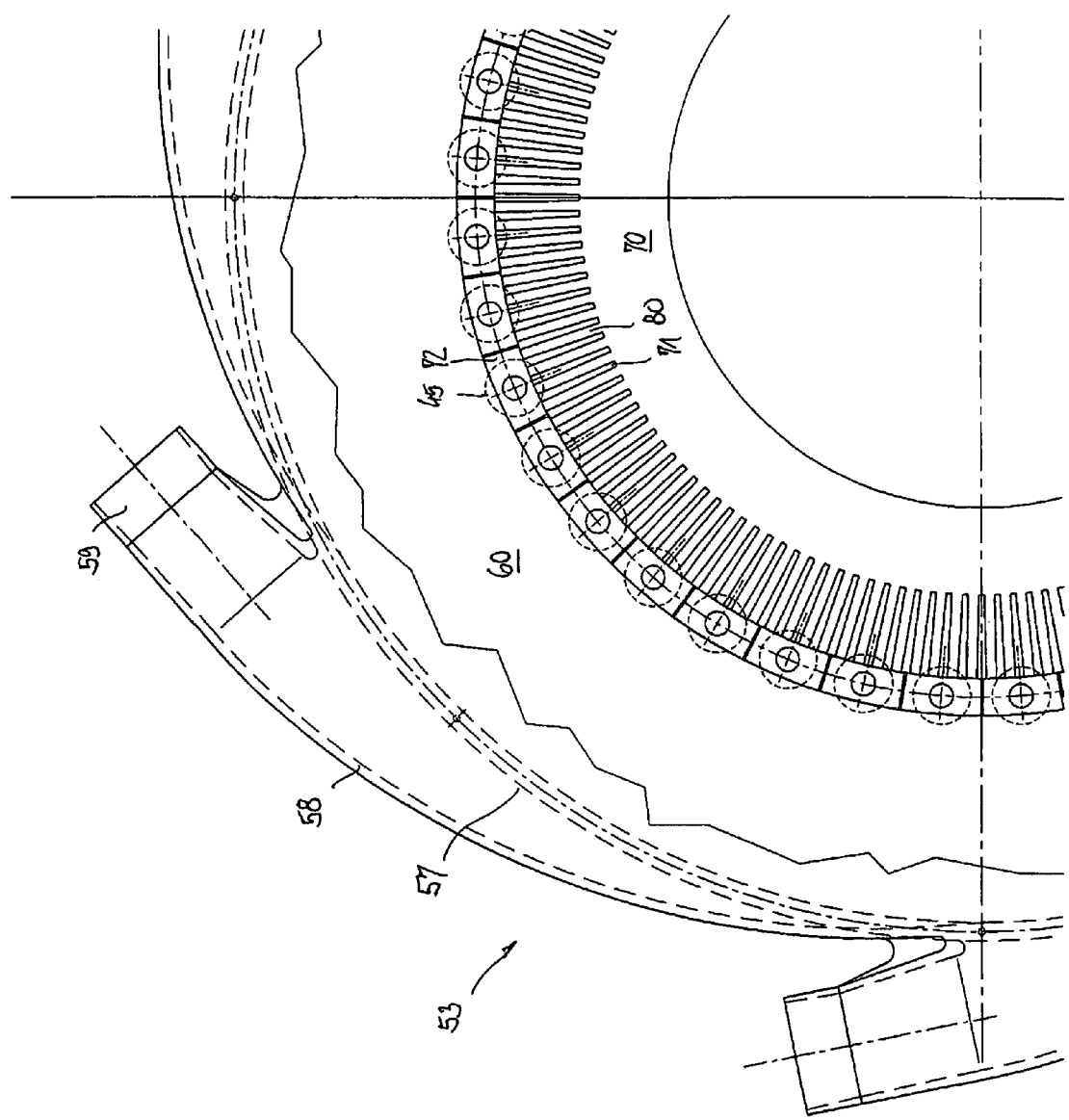
FIG. 7 illustrates details of the upper cooling ring according to FIG. 6 in a cross-sectional view through the cooling ring.

FIG. 7 shows the cooling ring 53 according to FIG. 6 in a horizontal section. As shown, the annular housing 57, individual running-in sleeves 58 and round attaching sleeves 59 are provided. In the annular chamber 60, shown in section, an exit gap 70 can comprise circumferentially distributed slide elements 72 which can be loaded by one of the adjusting elements 45 and set as a result. In this way, the respective free passage cross-sections of the radial channels 80 can be varied, with a plurality of channels being jointly controllable by one single adjusting element 45. In this way, the volume flow can be controlled in sectors around the circumference of the annular exit gap 70, so that the cooling effect on the blown film 14 can be varied in such a way that, around the circumference, it is possible to achieve a uniform blown film thickness, which, during production, is measured continuously or at intervals behind the freeze limit.

In FIG. 8, any details identical to those shown in FIG. 6 have been given the same reference numbers. To that extent, reference is made to the description of FIG. 2 and the additional description of FIG. 6. Two cooling rings 13, 53 can be provided which do not adjoin one another directly in a planar way, but can be connected via an intermediate disc-shaped housing 63 which can substantially comprise planar attaching faces and individual deepened radial channels 64 and a radially inwardly opening annular cooling gas nozzle 65. Additional cooling gas can be supplied to the individual radial channels 64 via the individual supply lines 66.

Figure 9:
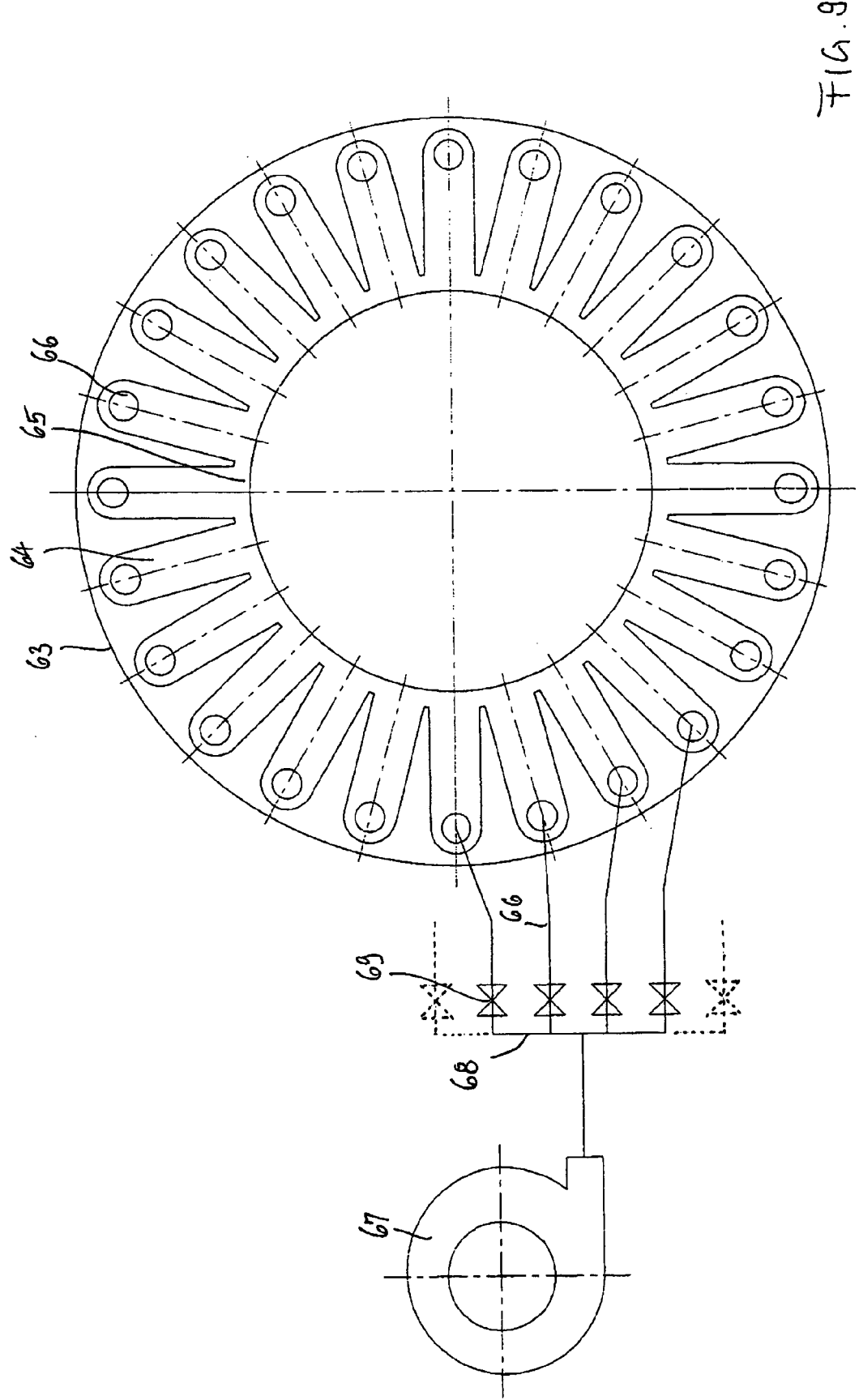
FIG. 9 illustrates the disc-shaped housing according to FIG. 8 in an axial view with volume flow control means.

In FIG. 9, the disc-shaped housing 63 is shown in a plan view. Deepened milled radial channels 64 can be provided having supply lines 66 which can be combined at the inner circumference to form one single annular cooling gas nozzle 65. A cooling gas blower 67 can be provided which, via a branch line 68 and individual control elements 69, can variably control the individual supply lines 66 for the cooling gas. In this way, it is possible to achieve an effect which is similar to that of the volume flow control according to FIGS. 2 and 3. Only some of the lines 66 in the Figures have been shown in continuous lines and others in dashed lines in order to illustrate that all of the radial channels 64 can be controllably supplied with cooling gas by the supply lines 66.

Figure 10:
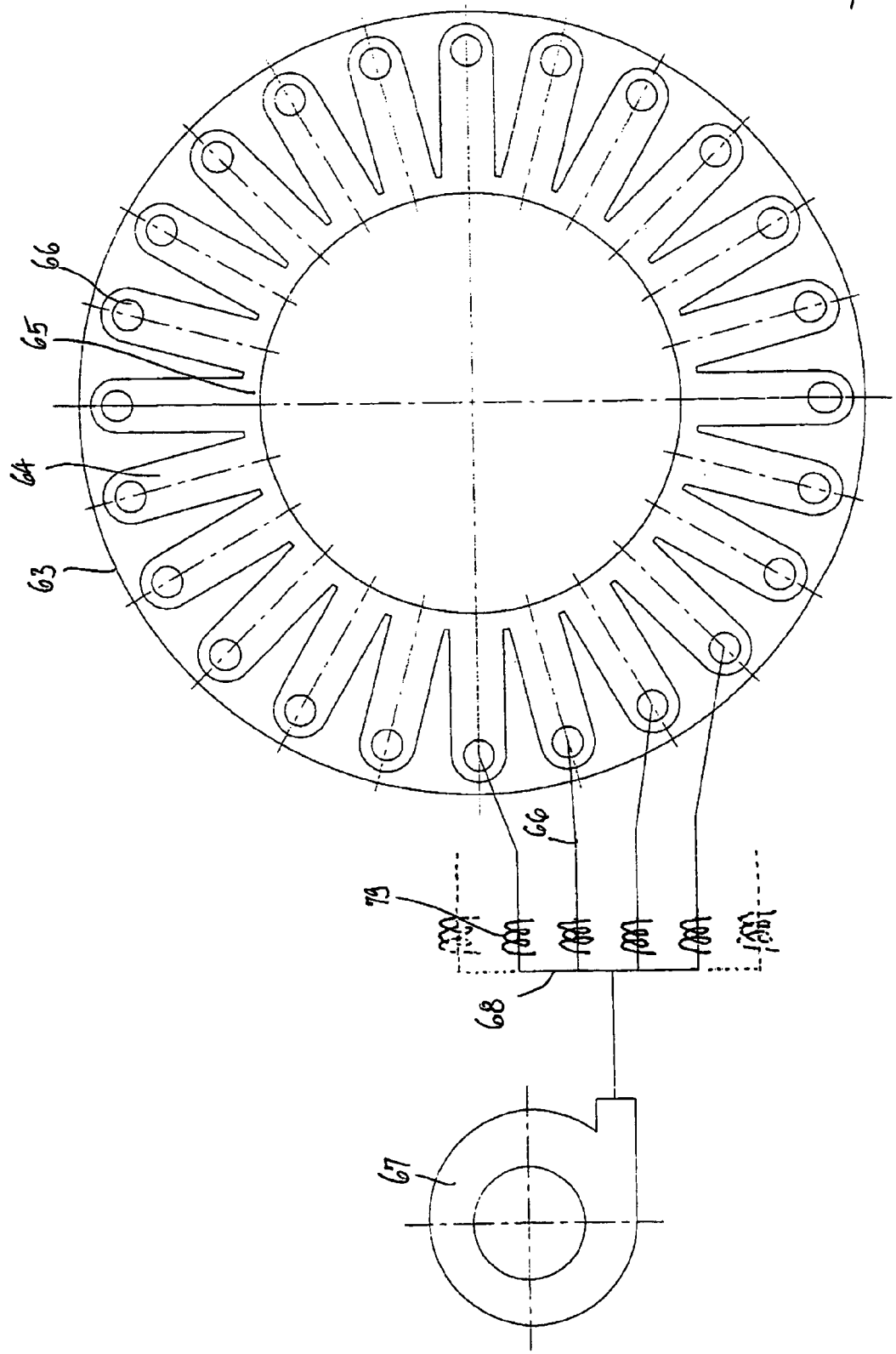
FIG. 10 illustrates the disc-shaped housing according to FIG. 8 in an axial view with temperature control means.

In FIG. 10, the disc-shaped housing 63 is shown in a plan view. Deepened milled radial channels 64 can be provided having supply lines 66 which, can be combined at the inner circumference to form one single annular cooling gas nozzle 65. A cooling gas blower 67 can be provided which can variably control the temperature of the cooling gas in the individual supply lines via a branch line 68 and individual heating elements 79. Thus, it is possible to achieve an effect which is similar to that of the temperature control according to FIGS. 4 and 5. Only some of the lines 66 in the Figures have been shown in continuous lines and others in dashed lines in order to illustrate that all the radial channels 64 can be supplied with cooling gas with a differentiated controllable temperature via supply lines.

In FIG. 11, any details identical to those shown in FIG. 6 have been given the same reference numbers as in FIG. 6. To that extent, reference is made to the description of FIG. 2 and to the additional description of FIG. 6. In FIG. 11, however, spacing elements 77 are provided between the two cooling rings 13, 53. Said cooling device can substantially function in the same way as that shown in FIG. 6.

In FIG. 12, identical details have been given the same reference numbers as in the preceding Figures, with particular reference being made to the description of FIG. 6. Instead of the spacing elements according to FIG. 11, FIG. 12 shows a further height-adjustable holding element 76 which can be arranged between the cooling rings 13, 53, and which can be firmly arranged at the lower cooling ring 13 and which can be adjustable with respect to height of the upper cooling ring 53 relative to the lower cooling ring 13. This adjusting device is able to adjust the length of the so-called neck of the blown film prior to the widening of its diameter, and thus the length of the effective cooling path.

It can be appreciated that the cooling rings 13, 53 can include the cooling gas ring in form of a segment disc 63 which can optionally be provided with volume flow control means and/or temperature control means in order to achieve a variable volume flow control or temperature control of the cooling gas in sectors around the circumference.

The invention claimed is:

1. A device for cooling blown film comprising thermoplastic plastics during the production of blown film for being arranged at a blown film extruder with a film blowing head, the film blowing head comprising:
an annular nozzle from which the blown film is guided away in an extraction direction, and further comprising
at least three annular cooling gas nozzles arranged at a distance from the annular nozzle thereby forming at least three blowing-out planes, wherein
at least one of the at least three annular cooling gas nozzles is directed against the extraction direction of the blown film,
at least one of the at least three annular cooling gas nozzles is directed in a radial direction toward the blown film, and
at least one of the at least three annular cooling gas nozzles is directed in the extraction direction of the blown film, and wherein
the at least one annular cooling gas nozzle directed in a radial direction toward the blown film is arranged between the at least one annular cooling gas nozzle directed against the extraction direction of the blown film and the at least one annular cooling gas nozzle directed in the extraction direction of the blown film, wherein
the at least one annular cooling gas nozzle directed against the extraction direction of the blown film and the at least one annular cooling gas nozzle directed in the extraction direction of the blown film provide a common cooling ring and are fed from a common annular chamber, wherein
on the inside of the annular chamber an annular exit gap is provided, said annular exit gap being divided into channels for supplying all of the at least three annular cooling gas nozzles,
further comprising at least one variable controlling means, said at least one variable controlling means selected from the group consisting of means for circumferentially variably controlling in sectors the volume flow of said annular cooling gas nozzles and means for circumferentially variably controlling in sectors the temperature of the cooling gas flow of said annular cooling gas nozzles, wherein
said annular exit gap being provided with radial channels, and wherein
the variable controlling means has independently controlled setting elements provided in the annular chamber or in the annular exit gap so as to vary the free passage cross-sections of the radial channels or the temperature in sectors.

2. A device according to claim 1, further comprising at least two annular cooling gas nozzles directed in the extraction direction of the blown film and at least two annular cooling gas nozzles directed opposed to the extraction direction of the blown film, wherein the annular exit gap supplies all of the at least two annular cooling gas nozzles directed in the extraction direction of the blown film and all of the at least two annular cooling gas nozzles directed opposed to the extraction direction.

3. A device according to claim 1, further comprising a sucking-off device for the cooling gas distributed around the circumference and between the annular nozzle of the film blowing head and the at least one annular cooling gas nozzle directed against the extraction direction of the blown film.

4. A device according to claim 1, further comprising an annular deflection plate is arranged above the film blowing head.

5. A device according to claim 1, further comprising thermal insulation means arranged on the film blowing head.

6. A device for cooling blown film comprising thermoplastic plastics during the production of blown film for being arranged at a blown film extruder with a film blowing head, the film blowing head comprising:
an annular nozzle from which the blown film is guided away in an extraction direction, and further comprising at least three annular cooling gas nozzles arranged at a distance from the annular nozzle thereby forming at least three blowing-out planes, wherein at least one of the at least three annular cooling gas nozzles is directed against the extraction direction of the blown film, at least one of the at least three annular cooling gas nozzles is directed in a radial direction toward the blown film, and at least one of the at least three annular cooling gas nozzles is directed in the extraction direction of the blown film, and wherein the at least one annular cooling gas nozzle directed in a radial direction toward the blown film is arranged between the at least one annular cooling gas nozzle directed against the extraction direction of the blown film and the at least one annular cooling gas nozzle directed in the extraction direction of the blown film, wherein the at least one annular cooling gas nozzle directed against the extraction direction of the blown film and the at least one annular cooling gas nozzle directed in the extraction direction of the blown film provide a common cooling ring and are fed from a common annular chamber, wherein on the inside of the annular chamber an annular exit gap is provided, said annular exit gap being divided into channels for supplying all of the at least three annular cooling gas nozzles, further comprising only one variable controlling means, said only one variable controlling means selected from the group consisting of means for circumferentially variably controlling in sectors the volume flow of said annular cooling gas nozzles and means for circumferentially variably controlling in sectors the temperature of the cooling gas flow of said annular cooling gas nozzles, wherein said annular exit gap being provided with radial channels, and wherein the variable controlling means has independently controlled setting elements provided in the annular chamber so as to vary the free passage cross-sections of the radial channels or the temperature in sectors.

7. A cooling ring for use with a blown film extruder that is adapted to move blown film in an extraction direction, the cooling ring comprising:

an annular housing defining an annular chamber having an annular exit gap;

a first annular cooling gas nozzle that communicates with the annular exit gap and is adapted to direct a flow of cooling gas from the annular chamber to the blown film in a direction that is against the extraction direction of the blown film;

a second annular cooling gas nozzle that communicates with the annular exit gap and is adapted to direct a flow of cooling gas to the blown film in a direction that is radial to the extraction direction of the blown film;

a third annular cooling gas nozzle that communicates with the annular exit gap and is adapted to direct a flow of cooling gas from the annular chamber to the blown film in the extraction direction of the blown film, wherein the second annular cooling gas nozzle is arranged between the first annular cooling gas nozzle and the third annular cooling gas nozzle.

8. The cooling ring defined in claim 7 further including a means for circumferentially variably controlling in sectors a volume flow of the annular cooling gas nozzles.

9. The cooling ring defined in claim 7 further including a means for circumferentially variably controlling in sectors a temperature of the cooling gas flow of the annular cooling gas nozzles.

10. The cooling ring defined in claim 7 further wherein the annular exit gap being provided with radial channels.

11. The cooling ring defined in claim 10 further including a variable controlling means having independently controlled setting elements provided in the annular chamber or in the annular exit gap so as to vary in sectors either volume flow of the annular cooling gas nozzles or temperature of the cooling gas flow of the annular cooling gas nozzles.

12. The cooling ring defined in claim 7 further including a fourth annular cooling gas nozzle that communicates with the annular exit gap and is adapted to direct a flow of cooling gas from the annular chamber to the blown film in the extraction direction of the blown film.

13. The cooling ring defined in claim 7 further including a cooling gas blower that communicates through a plurality of individual supply lines with the second annular cooling gas nozzle.

14. The cooling ring defined in claim 13 further including individual control elements provided in each of the individual supply lines.

15. The cooling ring defined in claim 13 further including individual heating elements provided in each of the individual supply lines.

* * * * *